United States Patent [19]
Haynie et al.

[11] Patent Number: 5,822,274
[45] Date of Patent: Oct. 13, 1998

[54] METHOD AND APPARATUS FOR ACOUSTICALLY MEASURING THE LEVEL OF LIQUID IN A TANK

[75] Inventors: Carl R. Haynie, Pilot Hill; Jeffrey D. Wilson, Newcastle, both of Calif.

[73] Assignee: Flowline Inc., Los Alamitos, Calif.

[21] Appl. No.: 631,344

[22] Filed: Apr. 12, 1996

[51] Int. Cl.⁶ .................................................. G01S 15/08
[52] U.S. Cl. .............................................. 367/99; 367/908
[58] Field of Search .................................... 367/908, 902, 367/99, 105; 73/290 V; 340/621; 181/124

[56] References Cited

U.S. PATENT DOCUMENTS

| | | | |
|---|---|---|---|
| 4,000,650 | 1/1977 | Snyder | 367/908 |
| 4,145,914 | 3/1979 | Newman | 367/908 |
| 4,170,765 | 10/1979 | Austin et al. | 367/100 |
| 4,264,788 | 4/1981 | Keidel et al. | 179/110 A |
| 4,596,144 | 6/1986 | Panton et al. | 73/620 |
| 4,868,797 | 9/1989 | Soltz | 367/908 |
| 4,984,449 | 1/1991 | Caldwell et al. | 73/49.2 |
| 5,550,790 | 8/1996 | Velamoor et al. | 367/908 |

FOREIGN PATENT DOCUMENTS

WO 91/05226  4/1991  WIPO .
WO 95/19559  7/1995  WIPO .

Primary Examiner—Daniel T. Pihulic
Attorney, Agent, or Firm—Sheppard, Mullin, Richter & Hampton; James R. Brueggemann

[57] ABSTRACT

A time-domain reflectometer is disclosed for reliably measuring the level of a liquid in a tank. The reflectometer emits an acoustic signal into a waveguide that projects downwardly into the tank and receives a return acoustic signal reflected from the surface of the liquid. The time delay between the transmitted acoustic signal and the reflected acoustic signal is a measure of the level of the liquid, and the reflectometer converts this level measurement into a electrical current that is linearly proportioned between predetermined minimum and maximum values. In addition, the reflectometer incorporates a liquid- and vapor-impervious membrane disposed in the path of the transmitted and reflected acoustic signals, adjacent to the transmitter and receiver, to prevent the escape of liquid and vapor from the tank and to isolate the electronics, including the transmitter and receiver, from such liquid and vapor.

33 Claims, 5 Drawing Sheets

UPPER
LIMIT

METHOD AND APPARATUS FOR ACOUSTICALLY MEASURING THE LEVEL OF LIQUID IN A TANK

BACKGROUND OF THE INVENTION

This invention relates generally to apparatus for measuring the level of a liquid in a tank and, more particularly, to acoustic transducer apparatus that transmit acoustic signals toward the surface of the liquid and measure the time delay to receipt of a reflected acoustic signal.

Acoustic transducer apparatus of this particular kind are known as time-domain reflectometers. They typically include an acoustic transmitter mounted at the top of the tank and configured to emit an acoustic signal downwardly into the tank. This acoustic signal is reflected by the upper surface of any liquid in the tank back to an acoustic receiver disposed alongside the transmitter. The round-trip time delay for the acoustic signal is a measure of the level of the liquid in the tank. Alternatively, the acoustic transmitter and receiver can be mounted at the bottom of the tank and configured to measure the acoustic signal's round-trip time delay to the liquid surface via the liquid, itself. Conveniently, the acoustic transmitter can take the form of a buzzer and the acoustic receiver a microphone.

Sometimes, time-domain reflectometers of this kind have included waveguides that project downwardly into the tank, for confining the path of the acoustic signal. In addition, special reference targets sometimes can be disposed at predetermined locations in the path, to produce reflections that are useful in calibrating the apparatus.

Although the time-domain reflectometers described briefly above have functioned generally satisfactorily in measuring liquid level, their use has not been entirely satisfactory. One deficiency of such reflectometers arises from a general failure to isolate the acoustic transmitter and receiver, and their associated electrical circuits, from the liquid, and from vapors from the liquid, in a cost-effective manner. In many cases, such liquid and vapor can corrode or otherwise damage these components. Another deficiency resides in the complexity of the manner in which such reflectometers provide a signal representing the level measurement.

It should, therefore, be appreciated that there is a need for an improved time-domain reflectometer, which more effectively isolates its sensitive components from the liquid whose level is being measured and which more efficiently provides a signal representing the level measurement. The present invention fulfills these needs.

SUMMARY OF THE INVENTION

The present invention resides in an improved time-domain reflectometer, and related method, that provides a measurement of the level of a liquid in a tank, while effectively isolating an acoustic transmitter, an acoustic receiver, and an associated electrical circuit from the liquid and vapors from the liquid. The acoustic transmitter and receiver are secured by a support in predetermined locations relative to the tank, such that the transmitter transmits an acoustic signal into the tank, whereupon it is reflected from the surface of any liquid in the tank back to the receiver. The receiver produces an electrical receive signal that is processed by the electrical circuit to produce a measurement of liquid level. A special liquid- and vapor-impervious membrane is disposed in the path of the transmitted acoustic signal and the reflected acoustic signal, to isolate the transmitter, receiver, and electrical circuit from the liquid and vapor.

More particularly, the support for the acoustic transmitter and the acoustic receiver includes a sensor housing having side-by-side openings for supporting these components. The support also includes a base having a lower opening that communicates with the interior of the tank and further having side-by-side upper openings that communicate with the lower opening and that align with the side-by-side openings of the sensor housing. The liquid- and vapor-impervious membrane is planar and disposed between the sensor housing and the base, being supported only at its periphery.

In other, more detailed features of the invention, the reflectometer further includes an elongated acoustic waveguide projecting downwardly from the base into the tank. The waveguide has an open lower end and a vented upper end, to allow the liquid to rise in the waveguide to a level that is the same as that of the liquid in the remainder of the tank. The waveguide is aligned with the base's lower opening, whereby it transmits the acoustic signal and the reflected acoustic signal. The waveguide has an internal cross-sectional size and shape that is substantially the same as that of the base's lower opening. Preferably, this cross-sectional shape is circular.

In operation, the reflectometer measures the time delay from the time the acoustic transmitter transmits the acoustic signal until the time the acoustic receiver receives the reflected acoustic signal, to produce a time delay measurement. The reflectometer then converts this time delay measurement to an electrical signal having a first value when the liquid level is determined to be at a predetermined first level, a second value when the liquid level is determined to be at a predetermined second level, and a linearly proportionate value between the first and second values when the liquid level is determined to be between the predetermined first and second levels. This conversion is achieved by generating a range enable signal that begins a first predetermined time delay after the transducer transmits the acoustic signal, i.e., the time delay that occurs when the liquid level corresponds to the first predetermined level, and that ends a second predetermined time delay after the transducer transmits the acoustic signal, i.e., the time delay that occurs when the liquid level corresponds to the predetermined second level. This conversion further includes comparing the detection signal with the range enable signal.

In other, more detailed features of the reflectometer's operation, the frequency of a clock is controllably adjusted according to a measure of temperature, so as to compensate for temperature-induced variations in the speed of the acoustic signal. In addition, the measurement of liquid level is converted to an electrical current that bears a linear relationship to the measured level. Thus, the reflectometer measures the electrical current being drawn and then draws sufficient additional electrical current to bring the total current drawn to a value that represents the measurement of the liquid level.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
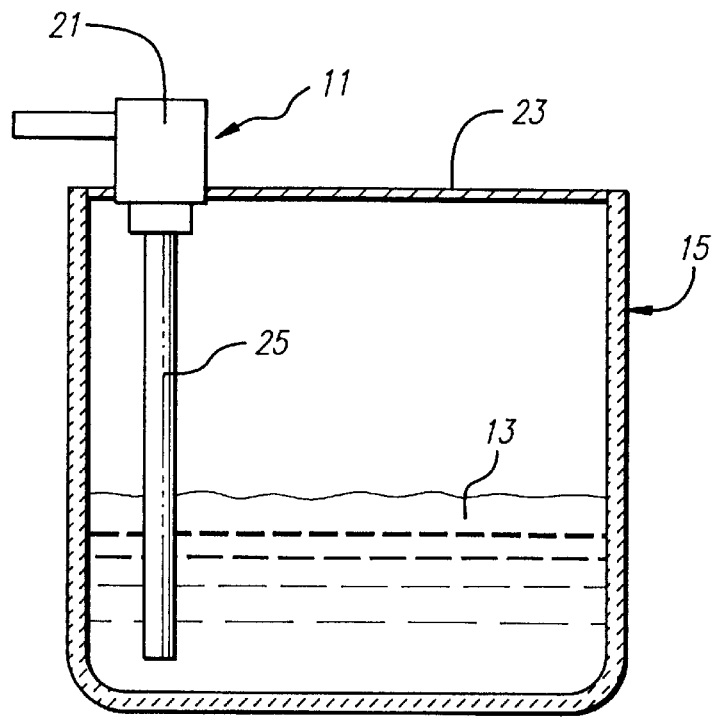
FIG. 1 is an elevational view of a time-domain reflectometer embodying the invention, shown secured to the top wall of a tank, for use in measuring the level of a liquid in the tank.
Figure 2:
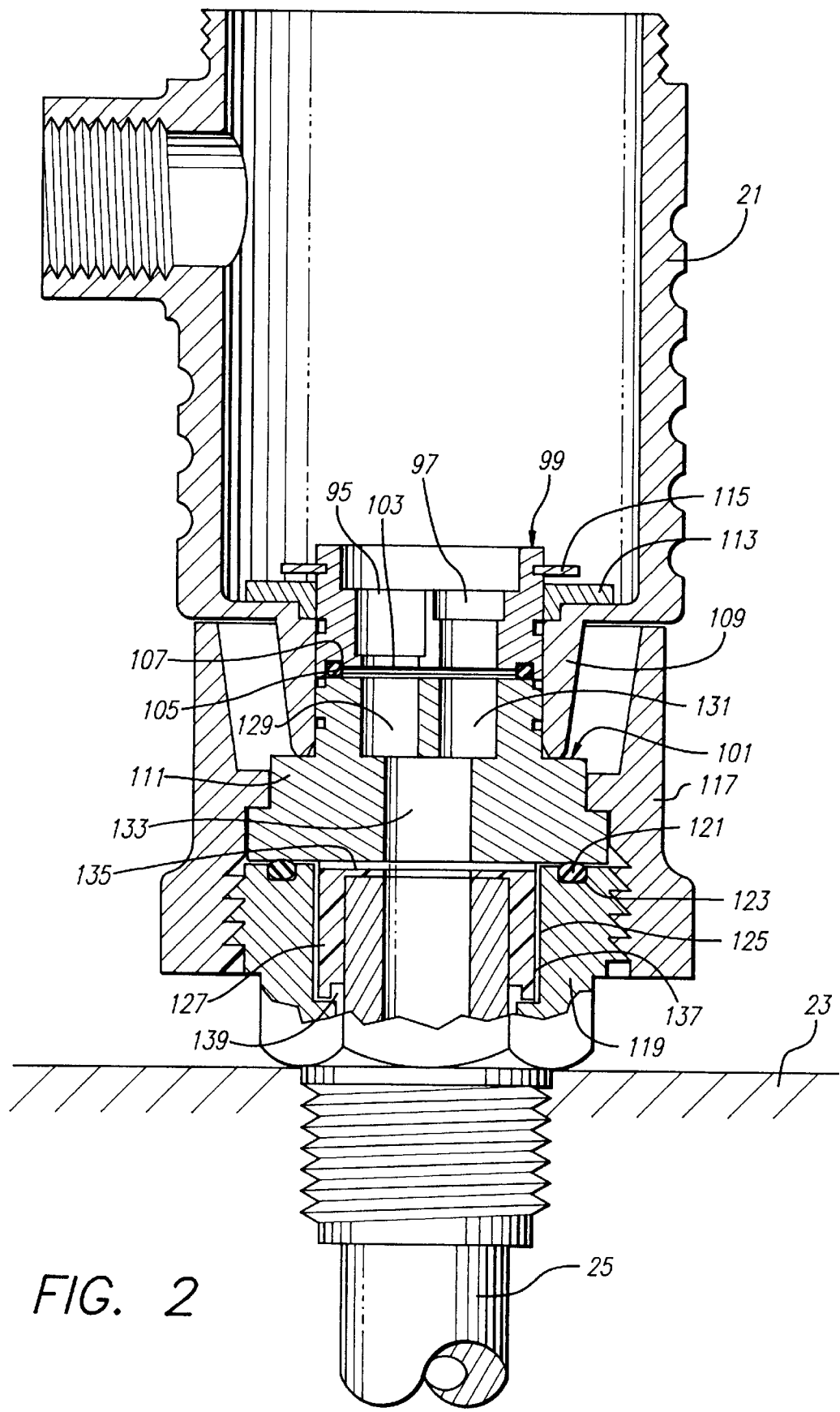
FIG. 2 is a cross-sectional view of the mechanical portion of the time-domain reflectometer of FIG. 1.
Figure 3:
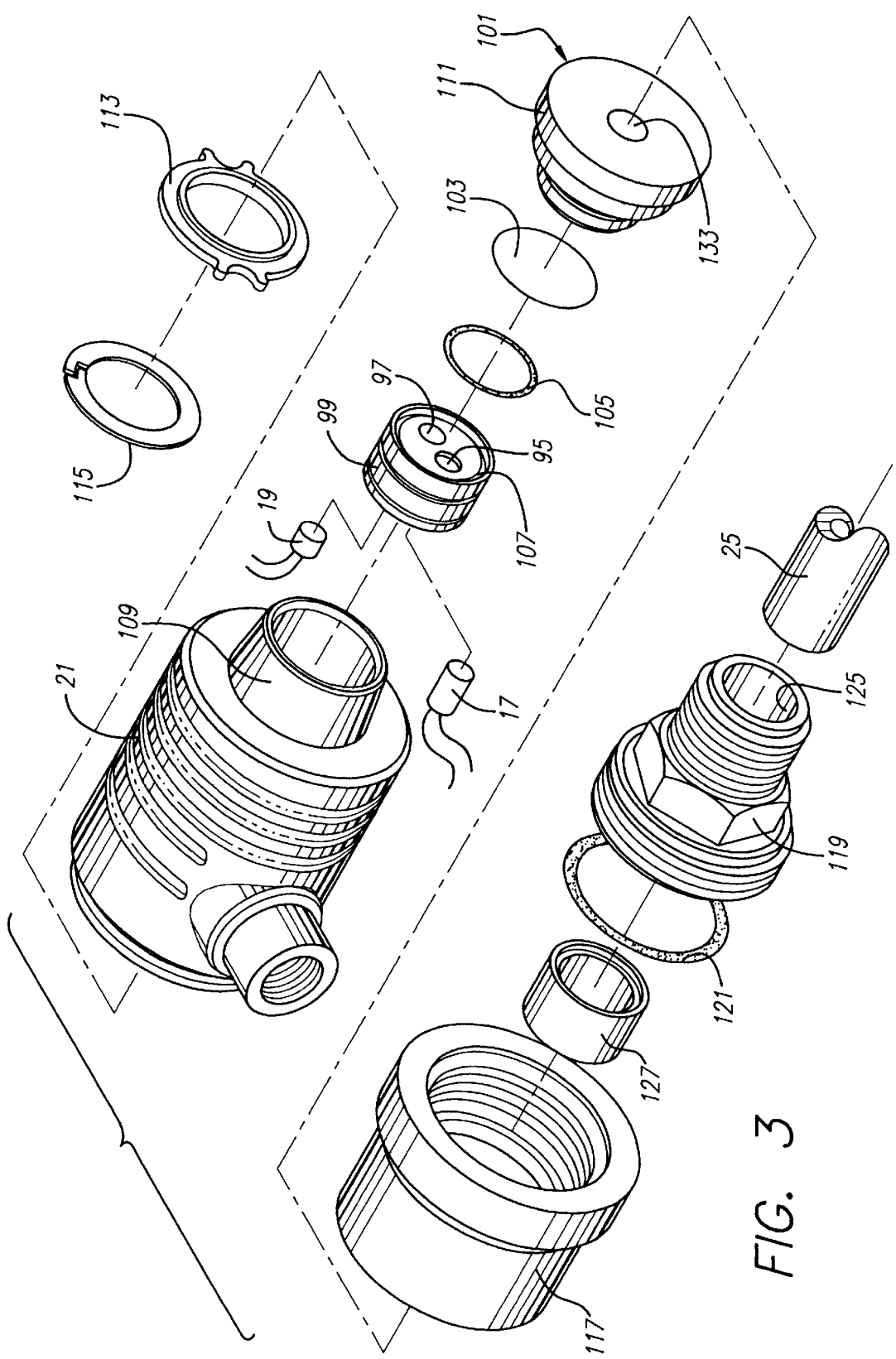
FIG. 3 is an exploded perspective view of the portion of the time-domain reflectometer depicted in FIG. 2.

With reference now to the drawings, and particularly to FIGS. 1–3, there is shown a time-domain reflectometer 11 suitable for use in measuring the level of a liquid 13 in a tank 15. The reflectometer includes an acoustic transmitter 17 and an acoustic receiver 19 located within an electronics housing 21 secured to a top wall 23 of the tank. The transmitter 17 emits a pulsed acoustic signal into an elongated pipe or acoustic waveguide 25 that projects downwardly from the housing to a location adjacent the bottom of the tank. The waveguide's lower end is open, and its upper end is vented, whereby the liquid can rise within the waveguide to a level that is the same as that of the liquid in the remainder of the tank. The top surface of the liquid within the waveguide reflects the acoustic signal back along the waveguide to the acoustic receiver 19, for detection. Measuring the acoustic signal's round-trip time delay, from the transmitter to the receiver, provides an indication of the level of the liquid in the tank. Conveniently, the transmitter can take the form of a buzzer and the receiver a microphone.

The time-domain reflectometer 11 further includes electrical circuitry housed within the electronics housing 21, for conditioning the acoustic transmitter 17 to emit the pulsed acoustic signal into the acoustic waveguide 25 and for measuring the acoustic signal's round-trip time delay and producing the measurement of liquid level. The circuitry measures the acoustic signal's round-trip time delay and produces an appropriately scaled output signal having an electrical current that indicates the measured level of the liquid 13 in the tank 15. A simplified block diagram of this circuitry is depicted in FIG. 4.

Figure 4:
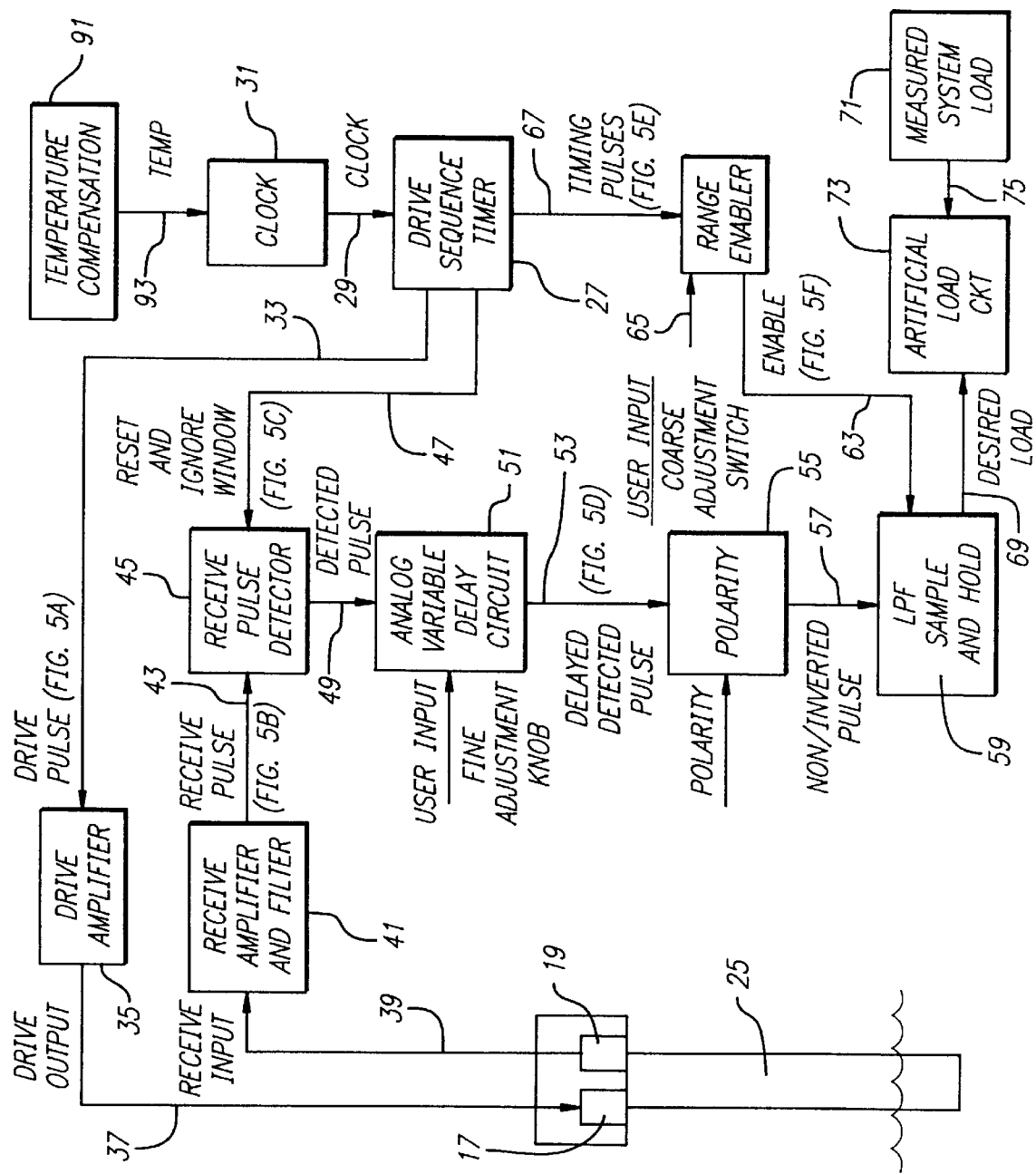
FIG. 4 is a simplified block diagram of the electrical subsystem portion of the time-domain reflectometer of FIG. 1.
Figure 5A:
FIGS. 5A–5G are timing diagrams depicting several waveforms present in the electrical subsystem portion of the time-domain reflectometer, as depicted in FIG. 4.
Figure 5B:
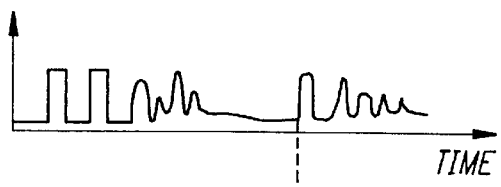

More particularly, and with specific reference to the block diagram of FIG. 4, the time-domain reflectometer 11 includes a drive sequence timer 27 that receives a clock signal on line 29 from a clock circuit 31 and produces a pulse signal for transmission on line 33 to a drive amplifier 35 and, in turn, on line 37 to the acoustic transmitter 17. This pulse signal (see FIG. 5A) includes two closely spaced pulses at the beginning of each cycle of operation, which causes the transmitter to emit short bursts of sound down the acoustic waveguide 25. The second pulse is provided to cancel resonances resulting from the first pulse. The reflected acoustic signal (FIG. 5B) received by the acoustic receiver 19 is coupled on line 39 to a receiver amplifier and filter 41, for amplification and filtering, and in turn on line 43 to a receive pulse detector 45.

The signal output by the acoustic receiver 19 ordinarily is somewhat noisy for a brief time period immediately after the acoustic signal has been emitted by the acoustic transmitter 17. This is due primarily to reflections of the acoustic signal from nearby structure, including the interior passageway of the waveguide 25. It is therefore desirable to disable the receive pulse detector 45 from evaluating the received signal during this brief time period.

Figure 5C:
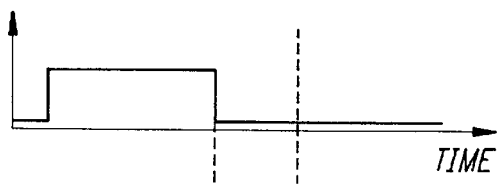

To this end, the drive sequence timer 27 outputs on line 47 a reset and ignore pulse signal (FIG. 5C), which initializes the pulse detector 45 and disables it from evaluating the received acoustic signal. This ignore pulse signal has a sufficient time duration to ensure that the pulse detector remains disabled until the noise has diminished to an acceptable level. One consequence of this disabling is that the reflectometer 11 is unable to detect liquid levels above a predetermined maximum level, which in normal circumstances can be less than one or two inches from the top of the tank 15. At this maximum level, the round-trip time delay for the acoustic signal corresponds to the duration of the ignore pulse signal. The measuring of liquid levels at or below this maximum level is unaffected by the ignore pulse signal. The duration of the ignore pulse signal thus establishes the maximum liquid level that can be measured.

The receive pulse detector 45 detects the initial pulse to occur in the received signal on line 43 after the ignore pulse signal on line 47 has ended. This initial pulse is presumed to result from a reflection of the acoustic signal from the surface of the liquid 13 in the tank 15. The receive pulse detector uses an exponentially decaying threshold, to compensate for the decaying strength of the acoustic signal as it moves along the waveguide 25. Upon detection of this initial pulse, the detector 45 outputs a detect pulse signal (FIG. 5D), which is supplied on line 49 to a variable delay circuit 51 and, in turn, on line 53 to a polarity select circuit 55 and on line 57 to a low-pass filter and sample and hold circuit 59. The functions of these circuits are described below.

The range of liquid levels that can be measured by the reflectometer 11 is determined by a range enabler 61, which outputs an enable signal (FIG. 5F) on line 63. This enable signal transitions from a low state to a high state at a time corresponding to the maximum liquid level to be detected, i.e., at the end of the ignore pulse signal (FIG. SC), and it transitions back to a low state at a time corresponding to the minimum liquid level to be detected. The range enabler 61 supplies this range enable signal on line 63 to the low-pass filter and sample and hold circuit 59. In the preferred embodiment, the maximum level is fixed, as described above, but the minimum level can be selected by the user.

A coarse adjustment of the minimum liquid level to be detected by the reflectometer 11 is made using a hexadecimal switch (not shown), which is connected to the range enabler 61 via lines 65. The range enabler also receives a timing pulse signal (FIG. 5E) on line 67 from the drive sequence timer 27. The pulses of this signal commence with the termination of the ignore pulse signal (FIG. SC), and they continue for a duration of sixteen pulses. The range enabler sets the duration of the range enable signal to correspond to the duration of the number of pulses from this timing pulse signal based on the number selected by the hexadecimal switch. The duration of sixteen pulses corresponds to the total round-trip delay when the liquid level is at its lowest possible level in the tank 15.

Figure 5D:
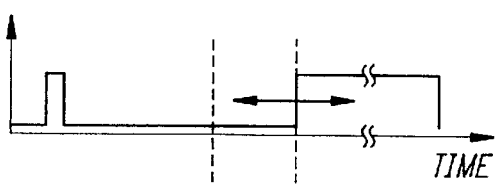
Figure 5E:
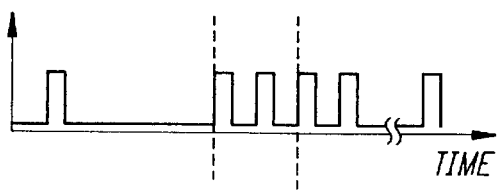
Figure 5F:
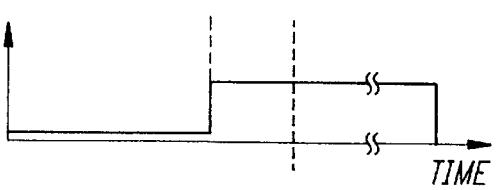
Figure 5G:
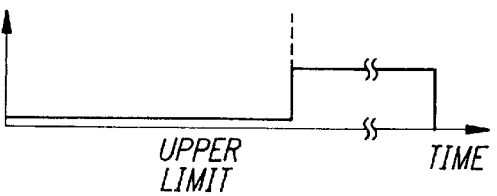

The low-pass filter and sample and hold circuit 59 filters the delayed detected pulse signal received on line 57 from the polarity selection circuit 55 for the duration of the range enable signal received on line 63 from the range enabler 61. This provides a voltage value that is a measure of the level of the liquid 13 in the tank 15. The voltage value then is held until the reflectometer's next cycle. The range enable signal is depicted in FIG. 5F, and one exemplary delayed detected pulse signal is depicted in FIG. 5D. As previously mentioned, the latter signal's transition from a low state to a high state occurs upon the detection of the initial pulse in the receive pulse signal on line 57. The indicated delay is selected by the user, using the variable delay circuit 51, to allow a fine adjustment of the minimum liquid level to be detected by the reflectometer 11.

The voltage value representing the low-pass filtered signal is output on line 69. A maximum value will occur if the delayed detected pulse signal transitions to the high state at the beginning of the range enable signal, which will occur if the liquid has a maximum level. Conversely, a minimum value will occur is the delayed detected pulse signal transitions to the high state at the end of the range enable signal, which will occur if the liquid has a minimum level.

The polarity selection circuit 55 is configured to allow the user to selectively invert the delayed detected pulse signal it supplies on line 57 to the low-pass filter and sample and hold circuit 59. If inverted, the held voltage value will be a maximum when the level of the liquid 13 in the tank 15 is a minimum, and it will be a minimum when the level of the liquid is a maximum.

The reflectometer 11 provides a signal of the level of the liquid 13 in the tank 15 by controllably adjusting the total amount of electrical current the reflectometer draws. When the level is at a maximum, the reflectometer conditions itself to draw a current of 20 milliamps, whereas when the level is at a minimum, it conditions itself to draw a current of just 4 milliamps. If the liquid level is detected to be between such maximum and minimum levels, the reflectometer conditions itself to draw a current proportionally between 4 and 20 milliamps. This result is achieved using a measured system load circuit 71 and an artificial load circuit 73. If the polarity selection circuit 55 has selected the opposite polarity, the reflectometer conditions itself to draw a 4-milliamp current when the liquid level is a maximum, a 20-milliamp current when the liquid level is a minimum, and a proportional current when the liquid level is between those extremes.

The measured system load circuit 71 provides a measurement of the electrical current drawn by the reflectometer 11, and this measurement is supplied on line 75 to the artificial load circuit 73. The artificial load circuit compares this current measurement with the voltage value supplied to it on line 69 from the low-pass filter and sample and hold circuit 59. This latter voltage value indicates the desired electrical current to be drawn by the reflectometer 11. In all cases, the desired current to be drawn by the reflectometer will exceed the measured current. In response to these two signals, the artificial load circuit draws whatever additional current is required to bring the total current drawn to the desired amount.

Figure 6:
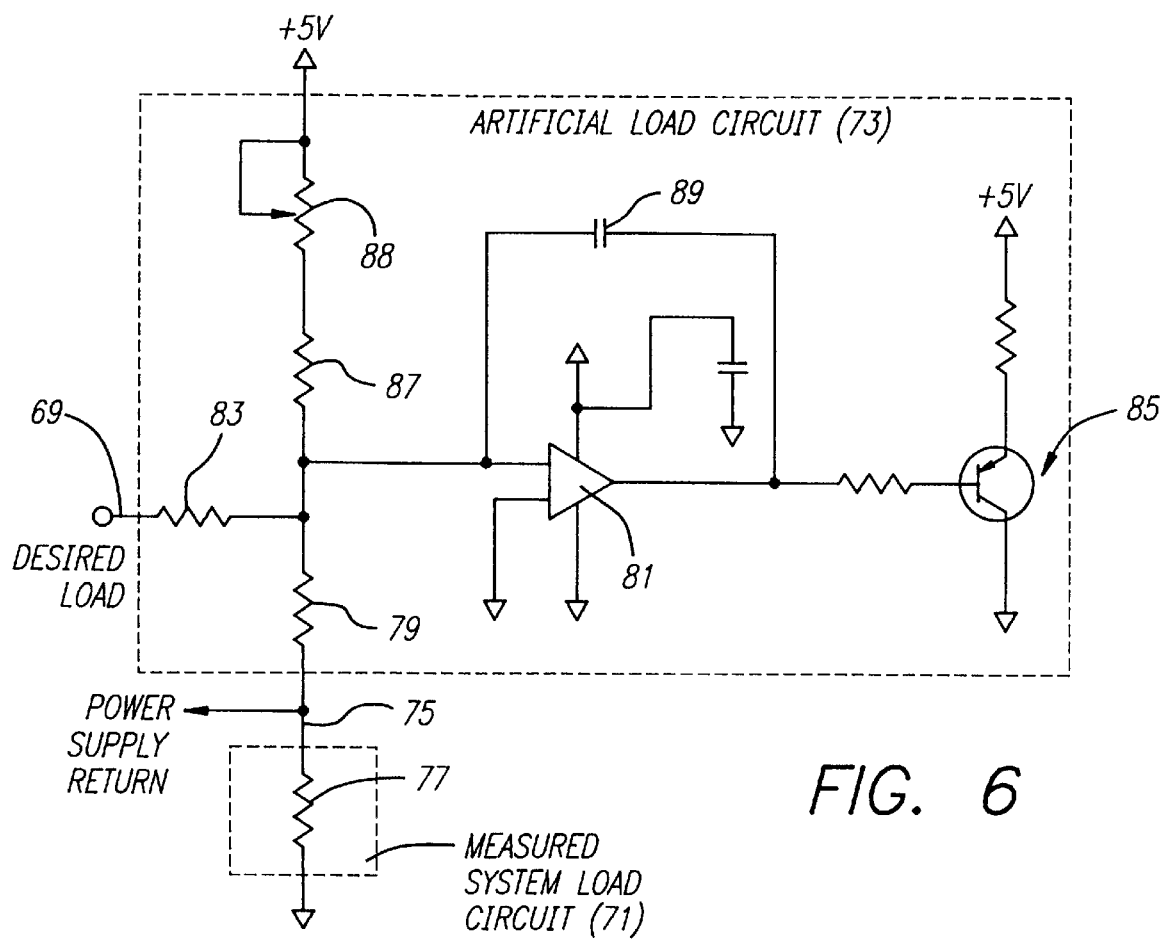
FIG. 6 is a schematic diagram of the artificial load circuit of FIG. 4.

FIG. 6 is a schematic diagram of the measured system load circuit 71 and the artificial load circuit 73. The measured system load circuit is simply a current-sensing resistor 77 connected between the reflectometer's signal ground terminal and the return line to the power supply (not shown). This resistor preferably has a resistance on the order of 10 ohms, such that the measurement of current load ranges from −40 millivolts to −200 millivolts.

The artificial load circuit 73 receives the system load current measurement on line 75, and it applies the measurement through a summing resistor 79 to the input terminal of an amplifier 81. The artificial load circuit also receives the desired load current measurement on line 69 from the low-pass filter and sample and hold circuit 59, and it applies the measurement through a summing resistor 83 to the same input terminal of the amplifier. The amplifier drives a transistor circuit 85, such that sufficient additional current is drawn to bring the two measurements, i.e., the system load current measurement and the desired load current measurement, into agreement.

The minimum load of 4 milliamps is determined by a resistor 87 and variable resistor 88, which are connected in series between the positive voltage supply terminal and the input terminal of the amplifier 81. The amplifier is stabilized by a feedback capacitor 89.

The speed of the acoustic signal traveling along the waveguide 25 will vary according to the temperature of the medium within the waveguide. To compensate for this variation, the reflectometer 11 further includes a temperature compensation circuit 91 (FIG. 4) that incorporates a thermal-sensing integrated circuit disposed in the vicinity of the acoustic transmitter 17 and receiver 19. The integrated circuit preferably is an LM35, manufactured by National Semiconductor, and it produces a voltage signal that varies linearly with temperature. The temperature compensation circuit 91 produces a control signal that is supplied on line 93 to the clock circuit 31 to vary the rate of the clock signal by an amount that compensates for the speed variation. Thus, if the temperature causes the acoustic signal to speed up by a particular amount, then the clock circuit is conditioned to speed up the rate of its clock signal by a corresponding amount. In this way, an accurate measurement of liquid level can be achieved regardless of temperature.

With reference again to FIGS. 2 and 3, the mechanical structure of the time-domain reflectometer 11 will be described with greater particularity. The electronics housing 21 of the reflectometer is secured to the top wall 23 of the tank 15, with the waveguide 25 projecting downwardly into the tank through an opening in the top wall. The respective acoustic transmitter 17 and the acoustic receiver 19 are supported in side-by-side openings 95 and 97 formed in a sensor housing 99. This sensor housing is mounted by screws (not shown) to the top side of a plastic base 101, and a taut membrane 103 is disposed therebetween. An O-ring 105 is disposed in an annular recess 107 formed in the underside of the sensor housing, encircling the openings 95 and 97 and the membrane. The O-ring supports the membrane at its periphery, and the center portion of the membrane is free-floating in a space of about 0.020 inches.

The base 101 and sensor housing 99 are held in a lower neck 109 of the electronics housing 21, with a stepped flange 111 of the base engaging the lower end of the neck and with a spacer 113 and lock ring 115 secured to the sensor housing and engaging the upper end of the neck. A union nut 117 also engages the base's stepped flange and mates with a union adapter 119 that is secured to the tank's upper wall 23. This secures the base, and thus the entire electronics housing, to the tank. An O-ring 121 is disposed within an annular recess 123 formed in the upper side of the union adapter, encircling a central opening 125 formed in the union adapter. A pipe socket 127 is located within the union adapter opening, and it is sized to receive and retain the upper end of the pipe or waveguide 25.

The base 101 incorporates side-by-side upper openings 129 and 131 that align with the respective openings 95 and 97 formed in the sensor housing 99. The base further incorporates a lower opening 133 that communicates with the two upper openings and that aligns with the passageway in the waveguide 25. Thus, a continuous pathway is defined for acoustic signals to travel from the acoustic transmitter 17 downwardly through the waveguide and upwardly back to the acoustic receiver 19. The upper openings 129 and 131 of the base have circular cross-sections that are the same size as the corresponding openings in the sensor housing, and the lower opening 133 of the base has a circular cross-section that is the same size as the opening in the waveguide.

When the time-domain reflectometer 11 is secured in its place on the top wall 23 of the tank 15, the waveguide 25 projects downwardly to a point near the tank's bottom. The bottom of the waveguide is open, to allow the entry of liquid 13, and the top of the waveguide is vented, to allow the liquid to rise within the waveguide to the same level as that of the liquid in the remainder of the tank. The venting occurs via a plurality of radial passageways 135 formed in the top of the waveguide socket 127 and via the annular space 137 between the socket's outer cylindrical wall and the union adapter 119 and via the space 139 between the waveguide and the union adapter. This allows the liquid to rise within the waveguide to a level that is the same as the level of the liquid disposed in the remainder of the tank.

It will be appreciated that the acoustic transducer apparatus is configured to prevent the escape of potentially harmful liquid 13 and vapors from the tank 15. The O-ring 121 prevents liquid and vapor from escaping radially outwardly between the union adapter 119 and the base 101, and the O-ring 105 prevents liquid and vapor from escaping radially outwardly between the base and the sensor housing 99. Further, the taut membrane 103 prevents liquid and vapor from escaping upwardly through the sensor housing, where it could damage the acoustic transmitter 17, the acoustic receiver 19, and other electronics located within the electronics housing 21.

The various components of the time-domain reflectometer 11 that are exposed to the liquid 13 and to vapors derived from the liquid preferably are formed of a compatible material. In most cases, polyvinyl chloride or polypropylene are considered suitable materials. The taut membrane 103 preferably is formed of polypropylene.

It should be appreciated from the foregoing description that the present invention provides an improved time-domain reflectometer, for reliably measuring the level of a liquid in a tank. The reflectometer emits an acoustic signal into a waveguide that projects downwardly into the tank and receives a return acoustic signal reflected from the surface of the liquid. The time delay between the transmitted signal and the return signal is a measure of the level of the liquid, and the reflectometer converts this level measurement into a electrical current that is proportioned between predetermined minimum and maximum values. In addition, the reflectometer is configured to prevent the escape of liquid and vapor from the tank and to isolate the electronics, including the transmitter and receiver, from such liquid and vapor.

Although the invention has been described in detail with reference to the presently preferred embodiment, those skilled in the art will appreciate that various modifications can be made without departing from the invention. Accordingly, the invention is defined only by the following claims.

We claim:

1. A method for measuring the level of a liquid in a tank, comprising:

positioning an acoustic transducer in a predetermined position relative to the tank and conditioning the transducer to transmit an acoustic signal toward a surface of a liquid located in the tank, which reflects the acoustic signal back to the transducer;

detecting the reflected acoustic signal and producing a corresponding detection signal;

measuring the time delay from the time the acoustic signal is transmitted by the acoustic transducer until the time of the detection signal, to produce a time delay measurement;

generating a range enable signal that begins a first predetermined time delay after the transducer transmits the acoustic signal and that ends a second predetermined time delay after the transducer transmits the acoustic signal, wherein the first predetermined time delay corresponds to the time required for the acoustic signal to travel from the transducer to the liquid surface and back to the transducer when the liquid level is at a predetermined first level, and wherein the second predetermined time delay corresponds to the time required for the acoustic signal to travel from the transducer to the liquid surface and back to the transducer when the liquid level is at a predetermined second level; and comparing the detection signal with the range enable signal, to produce a liquid level signal having a first value when the liquid level is determined to be at the predetermined first level, a second value when the liquid level is determined to be at the predetermined second level, and a linearly proportionate value between the first and second values when the liquid level is determined to be between the predetermined first and second levels.

2. A method as defined in claim 1, wherein comparing includes low-pass filtering the detection signal for the duration of the range enable signal, to produce the liquid level signal.

3. A method as defined in claim 1, wherein at least one of the first and second predetermined levels is controllably selectable.

4. A method as defined in claim 1, wherein measuring includes controllably varying the frequency of a clock signal, to compensate for temperature-induced variations in the speed of the acoustic signal.

5. A method as defined in claim 1, wherein:

the liquid level signal produced in comparing is an electrical current signal;

the method is implemented by a time-domain reflectometer circuit that draws a variable electrical current on a power line; and the method further includes measuring the electrical current drawn by the time-domain reflectometer on the power line, and drawing additional electrical current on the power line such that the total current drawn constitutes the liquid level signal that represents the measurement of the level of the liquid in the tank.

6. A method as defined in claim 1, wherein positioning includes positioning the acoustic transducer at an upper end of a waveguide that projects downwardly into the tank, such that the transducer transmits an acoustic signal along the waveguide toward the surface of the liquid, which reflects the acoustic signal back along the waveguide to the transducer.

7. A method as defined in claim 1, wherein positioning includes providing a support that secures the acoustic transducer in predetermined locations relative to the tank, and further providing a liquid- and vapor-impervious membrane in the path of the transmitted acoustic signal and the reflected acoustic signal, to isolate the acoustic transducer from the liquid, and from vapors from the liquid, disposed in the tank.

8. A method as defined in claim 7, wherein the liquid- and vapor-impervious membrane is substantially planar and is supported only at its periphery.

9. A time-domain reflectometer for measuring the level of a liquid in a tank, comprising:
- an acoustic transmitter positioned in a predetermined position relative to the tank and configured to transmit an acoustic signal toward a surface of a liquid located in the tank, which reflects the acoustic signal back to the transducer;
- an acoustic receiver positioned in a predetermined position relative to the tank and configured to receive the reflected acoustic signal and to produce a corresponding detection signal;
- a timing circuit that measures the time delay from the time the acoustic signal is transmitted by the acoustic transducer until the time the acoustic receiver produces the detection signal, to produce a time delay measurement;
- a range enable circuit that produces a range enable signal that begins a first predetermined time delay after the transmitter transmits the acoustic signal and that ends a second predetermined time delay after the transmitter transmits the acoustic signal, wherein the first predetermined time delay corresponds to the time required for the acoustic signal to travel from the transmitter to the liquid surface and back to the transmitter when the liquid level is at a predetermined first level, and wherein the second predetermined time delay corresponds to the time required for the acoustic signal to travel from the transmitter to the liquid surface and back to the transmitter when the liquid level is at a predetermined second level; and
- an output circuit that compares the detection signal with the range enable signal, to produce a liquid level signal having a first value when the liquid level is determined to be at the predetermined first level, a second value when the liquid level is determined to be at the predetermined second level, and a linearly proportionate value between the first and second values when the liquid level is determined to be between the predetermined first and second levels.

10. A time-domain reflectometer as defined in claim 9, wherein the output circuit is configured to low-pass filter the detection signal for the duration of the range enable signal, to produce the liquid level signal.

11. A time-domain reflectometer as defined in claim 9, wherein at least one of the first and second predetermined levels is controllably selectable.

12. A time-domain reflectometer as defined in claim 9, wherein the timing circuit is configured to controllably vary the frequency of a clock signal, to compensate for temperature-induced variations in the speed of the acoustic signal.

13. A time-domain reflectometer as defined in claim 9, wherein:
- the liquid level signal produced by the output circuit is an electrical current signal;
- the reflectometer draws a variable electrical current on a power line; and
- the reflectometer further includes
  - a circuit that measures the electrical current drawn by the reflectometer on the power line, and
  - a circuit that draws additional electrical current on the power line such that the total current drawn constitutes the liquid level signal that represents the measurement of the level of the liquid in the tank.

14. A time-domain reflectometer as defined in claim 9, wherein:
- the reflectometer further includes an acoustic waveguide that projects downwardly into the tank; and
- the acoustic transmitter is positioned at an upper end of the waveguide, such that the transmitter transmits an acoustic signal along the waveguide toward the surface of the liquid, which reflects the acoustic signal back along the waveguide to the acoustic receiver.

15. A time-domain reflectometer as defined in claim 9, and further comprising:
- a support that secures the acoustic transmitter and the acoustic receiver in predetermined locations relative to the tank; and
- a liquid- and vapor-impervious membrane located in the path of the transmitted acoustic signal and the reflected acoustic signal, to isolate the acoustic transmitter and the acoustic receiver from the liquid, and from vapors from the liquid, disposed in the tank.

16. A time-domain reflectometer as defined in claim 15, wherein the liquid- and vapor-impervious membrane is substantially planar and is supported only at its periphery.

17. A time-domain reflectometer that measures the level of a liquid in a tank, comprising:
- an acoustic transmitter configured to transmit an acoustic signal into the tank, whereupon the acoustic signal is reflected from the surface of any liquid disposed in the tank;
- an acoustic receiver configured to receive the reflected acoustic signal and produce an electrical receive signal;
- an electrical circuit that processes the electrical receive signal, to produce a measurement of the level of the liquid in the tank;
- a support that secures the acoustic transmitter and the acoustic receiver in predetermined locations relative to the tank, wherein the support comprises
  - a sensor housing having side-by-side openings for supporting the acoustic transmitter and the acoustic receiver, and
  - a base having a lower opening that communicates with the interior of the tank and further having side-by-side upper openings that communicate with the lower opening and that align with the side-by-side openings of the sensor housing; and
- a liquid- and vapor-impervious membrane disposed in the path of the transmitted acoustic signal and the reflected acoustic signal, between the sensor housing and the base, to isolate the acoustic transmitter, the acoustic receiver, and the electrical circuit from the liquid, and vapors from the liquid, disposed in the tank.

18. A time-domain reflectometer as defined in claim 17, wherein the membrane is formed of polypropylene.

19. A time-domain reflectometer as defined in claim 17, wherein the lower opening and the side-by-side upper openings of the base all have substantially circular cross-sections.

20. A time-domain reflectometer as defined in claim 19, wherein portions of the side-by-side upper openings of the base extend beyond the periphery of the lower opening of the base.

21. A time-domain reflectometer as defined in claim 17, wherein the liquid- and vapor-impervious membrane is substantially planar and is supported only at its periphery.

22. A time-domain reflectometer as defined in claim 17, and further including an elongated waveguide projecting downwardly from the base into the liquid in the tank, in alignment with the lower opening of the base, to transmit the acoustic signal and the reflected acoustic signal.

23. A time-domain reflectometer as defined in claim 22, wherein the waveguide has an internal cross-sectional size and shape substantially the same as that of the lower opening of the base.

24. A time-domain reflectometer as defined in claim 22, wherein the waveguide includes one or more ports at its upper end, for venting its internal passageway and thereby allowing the liquid within the waveguide to assume the same level as the liquid in the remainder of the tank.

25. A time-domain reflectometer that measures the level of a liquid in a tank, comprising:

a base having a lower opening and side-by-side upper openings communicating with the lower opening;

means for securing the base to a wall of the tank, with the lower opening of the base being exposed to the interior of the tank;

a liquid- and vapor-impervious membrane disposed across the side-by-side upper openings of the base, to seal the openings and prevent the exit through the openings of any liquid or vapor disposed in the tank;

an acoustic transmitter aligned with a first of the side-by-side upper openings of the base and configured to transmit an acoustic signal into the tank, via the lower opening, whereupon the acoustic signal is reflected from the surface of such liquid;

an acoustic receiver aligned with a second of the side-by-side upper openings of the base and configured to receive the reflected acoustic signal, via the lower opening; and an electrical circuit that measures the time delay from the time the acoustic transmitter transmits the acoustic signal until the time the acoustic receiver receives the reflected acoustic signal, to produce a time delay measurement that represents the level of the liquid in the tank.

26. An acoustic transducer as defined in claim 25, and further comprising a sensor housing disposed above the base and configured to support the acoustic transmitter and the acoustic receiver in their positions aligned with the side-by-side upper openings of the base.

27. An acoustic transducer as defined in claim 25, wherein the lower opening and the side-by-side upper openings of the base all have substantially circular cross-sections.

28. An acoustic transducer as defined in claim 27, wherein portions of the side-by-side upper openings of the base extend beyond the periphery of the lower opening of the base.

29. A time-domain reflectometer as defined in claim 25, wherein the liquid- and vapor-impervious membrane is substantially planar and is supported only at its periphery.

30. An acoustic transducer as defined in claim 25, and further including an elongated waveguide projecting downwardly from the base into the liquid in the tank, in alignment with the lower opening of the transducer, to transmit the acoustic signal and the reflected acoustic signal.

31. An acoustic transducer as defined in claim 30, wherein the waveguide has an internal cross-sectional size and shape substantially the same as that of the lower opening of the base.

32. An acoustic transducer as defined in claim 30, wherein the waveguide includes one or more ports at its upper end, for venting its internal passageway and thereby allowing the liquid within the waveguide to assume the same level as the liquid in the remainder of the tank.

33. An acoustic transducer as defined in claim 25, wherein the membrane is formed of polypropylene.

\* \* \* \* \*